United States Patent
Ambrose et al.

(10) Patent No.: US 6,998,365 B2
(45) Date of Patent: Feb. 14, 2006

(54) CATALYSTS FOR LOW-CURE POWDER COATINGS AND METHODS FOR USING THE SAME

(75) Inventors: Ronald R. Ambrose, Pittsburgh, PA (US); Shengkui Hu, Baden, PA (US); Shawn P. Duffy, Cheswick, PA (US); Anthony M. Chasser, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 253 days.

(21) Appl. No.: 10/673,312

(22) Filed: Sep. 29, 2003

(65) Prior Publication Data

US 2005/0069649 A1    Mar. 31, 2005

(51) Int. Cl.
| | |
|---|---|
| B01J 31/00 | (2006.01) |
| C08G 59/14 | (2006.01) |
| C08L 63/00 | (2006.01) |
| B05D 3/02 | (2006.01) |
| B32B 15/08 | (2006.01) |

(52) U.S. Cl. .................. 502/159; 502/167; 502/168; 502/172; 525/528; 525/533; 427/385.5; 428/918; 428/459

(58) Field of Classification Search ............... 502/159, 502/167, 168; 525/528, 533; 427/385.5; 428/418, 450

See application file for complete search history.

(56) References Cited

U.S. PATENT DOCUMENTS

| | | | |
|---|---|---|---|
| 4,324,739 A | 4/1982 | Zondler et al. | 260/465.4 |
| 5,569,733 A | 10/1996 | Donnelly et al. | 528/61 |
| 5,714,206 A | 2/1998 | Daly et al. | 427/475 |
| 5,907,020 A | 5/1999 | Correll et al. | 525/526 |
| 6,077,610 A | 6/2000 | Correll et al. | 428/413 |

FOREIGN PATENT DOCUMENTS

| | | |
|---|---|---|
| DE | 19512479 | 10/1996 |
| EP | 0594133 | 4/1994 |

*Primary Examiner*—J. A. Lorengo
*Assistant Examiner*—J. Pasterczyk
(74) *Attorney, Agent, or Firm*—Diane R. Meyers

(57) ABSTRACT

Catalysts useful for low-cure powder coating compositions are disclosed, having the structure (I):

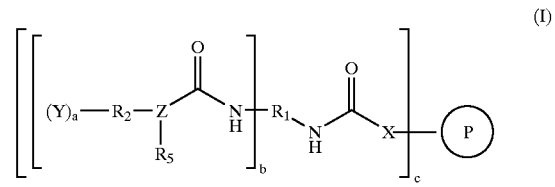

wherein $R_1$ is an organic radical having 6 to 25 carbon atoms; each $R_2$ is independently a multivalent hydrocarbon group having 1 to 20 carbon atoms; Y is

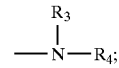

each $R_3$ and $R_4$ are independently alkyl or aryl groups having 1 to 12 carbon atoms; each Z is independently oxygen or nitrogen; $R_5$ is absent when Z is oxygen and $R_5$ is hydrogen, an alkyl or aryl group having 1 to 20 carbon atoms, or $(Y)_a$—$R_2$— when Z is nitrogen; a, b, and c are integers; each X is independently S, O, or $N(R_6)$; each $R_6$ is independently hydrogen or an alkyl or aryl group having 1 to 12 carbon atoms; and P is a polymeric material.

20 Claims, No Drawings

CATALYSTS FOR LOW-CURE POWDER COATINGS AND METHODS FOR USING THE SAME

FIELD OF THE INVENTION

The present invention relates to catalysts for powder coating compositions; more particularly, the present invention relates to such catalysts for use with low temperature cure thermosetting powder coating compositions. The compositions consistently produce coatings that have desirable performance properties when cured, and that are stable when uncured.

BACKGROUND OF THE INVENTION

Coating compositions have long been used to provide the surface of articles with certain desired physical characteristics, such as color, gloss and durability. Many coating compositions rely on a liquid carrier, which evaporates after the composition is applied. In recent years, powder coatings have become increasingly popular; because these coatings are inherently low in volatile organic content (VOCs), their use reduces air emissions during the application and curing processes as compared with liquid coatings.

Powder coatings are typically cured by heating the coated substrate to an elevated temperature. These temperatures almost always exceed 125° C., and commonly reach about 190° C. to 205° C. During the curing process, the powder particles melt, flow, and coalesce, and the components of the powder coating react. In addition to not emitting any VOCs into the environment during the application or curing processes, powder coating systems are extremely efficient since there is essentially no waste (i.e., application yield is approximately 100 percent). Because of the relatively high (i.e., greater than 125° C.) cure temperatures of most powder coatings, their use, for practical purposes, is often limited to substrates that can withstand such high temperatures or that can be heated to an appropriate temperature long enough for cure to occur.

Despite the desirability of low-cure powder compositions, two problems have prevented their widespread production and use—their mechanical stability and their chemical stability. Conventional powders that use resins with a glass transition temperature ("Tg") lower than 60° C. may encounter package stability problems, especially after prolonged heat exposure, and become fused, sintered or clumpy within days. Similarly, prolonged heat exposure can destroy the chemical stability of a powder if it includes crosslinkers that react at temperatures below about 170° C.; if a crosslinker with a lower cure temperature is used, cure may be initiated during storage even though the film has not been formed. The premature gelation that occurs in these powder formulations results in coatings having shortened gel times. It is not unusual for low-cure powders to lose >50 percent of their gel time as a result of the premature gelation.

Problems encountered when a powder loses either mechanical or chemical stability can be severe. Poor mechanical stability creates obvious handling, application and appearance issues. Poor chemical stability creates subtler yet just as problematic issues. For example, a powder that has poor chemical stability will fluidize and apply like virgin powder, but because it has advanced in reactivity (i.e. undergone some premature gelation), it demonstrates restricted flow or no flow at all during cure. The result can be a coating having an "orange peel" appearance, a rough texture or gel bodies.

Ideally, a powder should not lose its handling properties under elevated temperature storage and the gel time should remain the same as that of the virgin material. To achieve this, powders are typically formulated with resins having a Tg greater than about 60° C. and/or crosslinkers that react at temperatures of about 170° C. or greater. Such powders, however, are not low cure. Low-cure powders having lower Tg resins or lower temperature crosslinkers can require expensive storage under refrigeration and air-conditioned application facilities to overcome their inherent lack of stability, or must be prepared using special techniques.

Thus, there is a need in the coatings art for low-cure powder coatings having a wide range of application, which also have an acceptable level of durability when cured on the finished product and good stability at room temperature.

SUMMARY OF THE INVENTION

The present invention is directed to catalysts generally comprising tertiary amine and urea or urethane groups attached to a polymer. It has been surprisingly discovered that the present tertiary aminourea and/or aminourethane-containing polymers can be used to cure certain resins without the aid of crosslinkers, accelerators, or other additives typically regarded in the art as being necessary to cure these resins. The cured coatings that result from using the present catalysts have performance properties that are at least as good as powder coating compositions prepared with the same resins and conventional curing agents, but lacking the tertiary aminourea or aminourethane-containing polymer compositions described herein. Significantly, this desirable result is achieved using curing temperatures much lower than those used for conventional products. Accordingly, the present compositions are low-cure. "Low-cure" as used herein refers to powder coating compositions that cure at a temperature between about 80° C. and 125° C. However, the present invention is not limited to this temperature range and also provides cured films at temperatures up to and even greater than 190° C.

As a result of being low-cure, the present compositions can be used on substrates that are sensitive to temperatures greater than about 125° C. Examples include, but are not limited to, plastics such as thermoset and thermoplastic compositions, and wood. These compositions may also be used to coat pieces of thick metal that cannot be heated above about 95° C. because of their size. Also suitable are articles of manufacture that include a variety of substrates; for example, motors that contain both metal and rubber components can be suitably coated using the present, low-cure powder compositions.

The present compositions also overcome some of the difficulties that have been observed with other powder coating compositions, particularly other low-cure powders. For example, the present powder compositions are storage stable, and reduce, if not eliminate, the problems with chemical and mechanical stability seen with other low-cure powder compositions. The present compositions can be stored at room temperature, and they do not continue to catalyze the reaction of the resin molecules after the removal of heat. Moreover, the present powder compositions can be prepared using standard methods known in the art for preparing powder coating compositions; no special processing or handling is needed. Thus, the present compositions provide a significant advance in the low-cure powder coatings art.

Methods for coating substrates using the present powder compositions, and substrates coated thereby, are also within the scope of the present invention.

DETAILED DESCRIPTION OF THE INVENTION

The present invention is directed to a catalyst comprising a polymer having the structure of Formula I below:

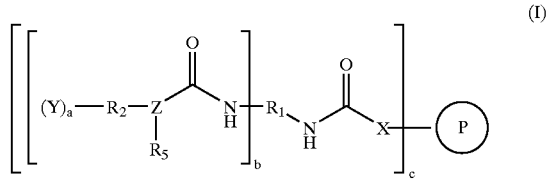

wherein $R_1$ is an organic radical having 6 to 25 carbon atoms; $R_2$ is a multivalent hydrocarbon group having 1 to 20 carbon atoms; Y is

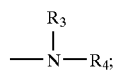

$R_3$ and $R_4$ are independently alkyl or aryl groups having 1 to 12 carbon atoms; Z is oxygen or nitrogen; $R_5$ is absent when Z is oxygen and $R_5$ is hydrogen, an alkyl or aryl group having 1 to 20 carbon atoms, or $(Y)_a$—$R_2$— when Z is nitrogen; a, b, and c are integers; X is S, O, or $N(R_6)$; $R_6$ is hydrogen or an alkyl or aryl group having 1 to 12 carbon atoms; and P is a polymeric material. It will be understood that when Z is oxygen, a tertiary aminourethane compound is represented and when Z is nitrogen, Formula I depicts a tertiary aminourea compound. "a" is at least one. Each "a" group can be attached to any of the carbons of the $R_2$ group, even though they are generally depicted in Formula I as being attached to the terminal carbon; more than one "a" group can be attached to a particular carbon. "b" is 1 or 2. It will be understood that each "b" group will be attached to a carbon from which an isocyanate group extends. "c" is at least one. If multiple $R_3$ and $R_4$ groups exist, each $R_3$ and each $R_4$ can be the same or different as other $R_3$ or $R_4$ groups. For example, one $R_3$ can have one carbon and another has two carbons, and the like. Similarly, when there are multiple Y, $R_2$, X, or Z groups, each Y, $R_2$, X and Z can be the same or different as other Y, $R_2$, X and Z groups.

The $R_1$ radical can be aliphatic such as hexamethylene, cycloaliphatic such as cyclohexylene, substituted cycloaliphatic such as 1,3,3-trimethylcyclohexylmethylene, or aromatic such as phenylene. For example, $R_1$ can be the residue of an isocyanate or polyisocyanate. Substituted cycloaliphatics are particularly suitable, especially 1,3,3-trimethylcyclohexylmethylene. Examples of suitable $R_2$ moieties include ethylene, n-propylene, and iso- and n-butylene. In a particularly suitable composition, X is oxygen, $R_1$ is 1,3,3-trimethylcyclohexylmethylene, Z is nitrogen, $R_2$ is propylene, $R_3$ and $R_4$ are both methyl groups, and $R_5$ is hydrogen and a is 1.

The polymer of Formula I can be prepared by reacting an organic polyisocyanate, particularly diisocyanate, with a polyamine containing a primary or secondary amine group and at least one tertiary amine group for the aminourea embodiment or with an alcohol or polyol containing at least one tertiary amine for the aminourethane embodiment, to form a first reaction product. The first reaction product is reacted with a polymer containing at least one functional group that is reactive with an isocyanate group. Suitable polyisocyanates include aliphatic, cycloaliphatic, or aromatic polyisocyanates. Diisocyanates are particularly suitable, although higher polyisocyanates can be used. Examples of suitable aromatic diisocyanates are 4,4'-diphenylmethane diisocyanate, 1,3-bis(1-isocyanato-1-methylethyl)benzene and derivatives thereof, and toluene diisocyanate. Examples of suitable aliphatic diisocyanates are straight chain aliphatic diisocyanates such as 1,6-hexamethylene diisocyanate and cycloaliphatic diisocyanates including isophorone diisocyanate and 4,4'-methylene-bis-(cyclohexyl isocyanate). Examples of suitable higher polyisocyanates are 1,2,4-benzene triisocyanate, polymethylene polyphenyl isocyanate and the isocyanurate of isophorone diisocyanate. Isophorone diisocyanate is especially suitable.

Examples of polyamines containing a primary or secondary amine group and at least one tertiary amine group are dimethylaminopropylamine, bis(dimethylamino)propylamine and 2-amino-5-diethylaminopentane. An example of an alcohol containing at least one tertiary amine group is dimethylaminopropanol. Dimethylaminopropylamine is particularly suitable.

The polyamine or amino alcohol and polyisocyanate are combined in an equivalent ratio of about 1:1. The reaction between a polyamine and polyisocyanate is usually carried out at low temperature, typically below 40° C. Normally, the polyamine is added over a period of time to the polyisocyanate in a time frame so that the temperature of the reaction medium does not increase significantly. The reaction between amino alcohol and the polyisocyanate is carried out similarly. It will be appreciated that the reaction between the isocyanate and amine or alcohol in an approximately 1:1 ratio will predominantly result in the largest bracketed portion of the structure depicted in Formula I, i.e. "c", but that other by-products will be produced in minor quantities. These by-products include, for example, compounds in which both of the isocyanate groups react with the amine/alcohol, and also some free isocyanate. The amounts of these by-products can be controlled by adjusting the reaction conditions and the equivalent ratios of starting materials.

The polymer or "polymeric material" used in the preparation of the catalyst of the present invention is one that comprises at least one functional group that is reactive with isocyanate functionality. Examples of suitable functional groups include hydroxy, amino, and thiol groups, with hydroxy groups being particularly suitable. It will be understood that when a hydroxy group on the polymer reacts with the isocyanate moiety, a urethane linkage is formed and "X" in Formula I will be oxygen. Other linkages are possible when a reacting group other than hydroxyl is present. Polymers having suitable functional groups include, for example, acrylics, polyesters, polyamides, polyepoxides, and the like. Polymers lacking suitable functional groups can be modified to contain such groups by methods standard in the art. "Suitable functional groups" refer to those that can react with the isocyanate moiety.

The reaction between the first reaction product and the polymer can be carried out using standard urethane synthesis techniques known to those skilled in the art. Any amount of the functional groups on the polymer can be reacted. This amount is controlled by the equivalent ratios between the polymer component and the residual isocyanate component derived from the reaction between the polyisocyanate and the polyamine or amino alcohol. The reaction is carried out under conditions where the end product is substantially free of isocyanate functionality.

Alternatively, the polymer of Formula I can be prepared by first reacting excess equivalents of a polyisocyanate with a polymer containing groups that are reactive with isocyanate groups. This isocyanate functional polymer may then be reacted with a polyamine containing a primary or secondary amine and at least one tertiary amine, or an alcohol containing at least one tertiary amine.

The reaction product of the polymer P from Formula I and the residual isocyanate component derived from the reaction between the polyisocyanate and the polyamine or amino alcohol can function as a catalyst to cure a resin. The catalyst typically has a Tg of from about 30° C. to 100° C., such as from about 40° C. to 100° C. This Tg range helps prevent any curing from taking place in the composition before the application of heat. This improves the long-term stability of curable compositions in which the catalyst of the present invention is used. The Tg of the catalyst is typically not so high, however, that curable compositions incorporating the catalyst lose their characterization as "low-cure".

The present invention is further directed to a curable powder composition comprising a resin and the polymeric catalyst described above. The resins include those that can form a film upon curing, for example, epoxy-containing resins and/or siloxane-containing resins. The term "epoxy-containing resin" is used herein to refer to any resin that has epoxy functional groups including, for example, polyepoxide resins and epoxy/hydroxy-containing resins. Similarly, the term "siloxane-containing resin" is used herein to refer to any resin that has siloxane and hydroxyl functionality. One or more of each of these resins and mixtures of these resins can also be used. Also, a composition that contains epoxy and/or siloxane functional resins can also contain any number of other functional groups and/or components as well.

The polyepoxide resins used in the present compositions are those that are suitable for use in powder coatings, and that contain at least two 1,2-epoxide groups per molecule. In general, the epoxy equivalent weight can range from about 180 to about 4000 based on solids of the polyepoxide, such as about 500 to 1000. The polyepoxides may be saturated or unsaturated, and may be aliphatic, alicyclic, aromatic, or heterocyclic. They may contain substituents such as halogens, hydroxyl groups, and ether groups.

Suitable classes of polyepoxides include epoxy ethers obtained by reacting an epihalohydrin such as epichlorohydrin with a polyphenol in the presence of an alkali. Suitable polyphenols include resorcinol, catechol, hydroquinone, bis(4-hydroxyphenyl)-2,2-propane (Bisphenol A), bis(4-hydroxyphenyl)-1,1-isobutane, bis(4-hydroxyphenyl)-1,1-ethane, bis(2-hydroxyphenyl)-methane, 4,4-dihydroxybenzophenone, and 1,5-dihydroxynaphthalene. The diglycidyl ether of Bisphenol A is especially suitable.

Other suitable polyepoxides include polyglycidyl ethers of polyhydric alcohols. These compounds may be derived from polyhydric alcohols such as ethylene glycol, propylene glycol, butylene glycol, 1,6-hexylene glycol, neopentyl glycol, diethylene glycol, glycerol, trimethylol propane, and pentaerythritol, or from polymeric polyols such as polypropylene glycol; some of these compounds may need to be treated to make them sufficient for use in powder coatings. Epoxy functional acrylic polymers can also be used as starting materials, such as glycidal methacrylate (GMA), as can other epoxy functional compounds, such as triglycidal isocyanurate (TGIC).

Examples of other suitable polyepoxides include polyglycidyl esters of polycarboxylic acids. These compounds may be formed by reacting epichlorohydrin or another epoxy material with an aliphatic or aromatic polycarboxylic acid such as succinic acid, adipic acid, azelaic acid, sebacic acid, maleic acid, 2,6-naphthalene dicarboxylic acid, fumaric acid, phthalic acid, tetrahydrophthalic acid, hexahydrophthalic acid, or trimellitic acid. Dimerized unsaturated fatty acids containing about 36 carbon atoms (Dimer Acid) and polymeric polycarboxylic acids such as carboxyl terminated acrylonitrile-butadiene rubber may also be used in the formation of these polyglycidyl esters of polycarboxylic acids.

Polyepoxides derived from the epoxidation of an olefinically unsaturated alicyclic compound are also suitable for use in the curable powder composition of the present invention. These polyepoxides are nonphenolic and are obtained by epoxidation of alicyclic olefins with, for example, oxygen, perbenzoic acid, acid-aldehyde monoperacetate, or peracetic acid. Such polyepoxides include the epoxy alicyclic ethers and esters well known in the art.

Other suitable polyepoxides include epoxy novolac resins. These resins are obtained by reacting an epihalohydrin with the condensation product of aldehyde and monohydric or polyhydric phenols. A typical example is the reaction product of epichlorohydrin with a phenol-formaldehyde condensate.

In one embodiment of the present invention, the resin utilized in the curable powder composition is at least one epoxy/hydroxy-containing resin. As used herein, the term "epoxy/hydroxy-containing resin" refers generally to at least one resin that comprises both epoxy and hydroxy functionality. Such a resin can be obtained, for example, by mixing one or more epoxy-containing resins and one or more hydroxy-containing resins. Alternatively, one or more resins having both epoxy and hydroxy functionality can also be used.

Examples of hydroxy-containing resins include, for example, hydroxy functional polyesters, polyethers, polyurethanes, or acrylics, prepared using methods generally known to those skilled in the art.

Epoxy functional resins can include, for example, acrylics having a glycidyl moiety, such as glycidyl methacrylate. The resin used can also be something that is typically regarded as an epoxy crosslinker, such as triglycidyl isocyanurate ("TGIC").

In another embodiment of the present invention, the resin used is at least one siloxane-containing resin. As noted above, a "siloxane-containing resin" refers to any resin that has at least one siloxane moiety and at least one hydroxyl group. These resins are widely commercially available. A suitable selection of siloxane resins is available from Wacker Chemie in its SILRES line of products.

Typically, the resin is present in the curable composition of the present invention in a range of from about 20 to about 90 percent, such as about 30 to 60 percent, based upon total weight of the curable composition. The catalyst is typically present in the compositions of the invention in a range of from about 0.5 to 10 weight percent, such as 3 to 7 weight percent. It is expected that the rate of cure increases as the concentration of catalyst increases, and that these increases are directly proportional to each other. It is surprising, however, that no decrease in chemical or mechanical stability is noted as higher catalyst levels are used; stability often behaves inversely proportional to reactivity, in that as reactivity increases, stability decreases. This maintained stability with increased reactivity is yet another advantage of the present invention.

The powder coating compositions of the present invention may optionally contain additives such as waxes for flow and wetting, flow control agents, such as poly(2-ethylhexyl) acrylate, degassing additives such as benzoin and MicroWax C, adjuvant resin to modify and optimize coating properties, antioxidants and the like. These optional additives, when used, can be present in amounts up to 10 weight percent, based on total weight of the coating composition, and if used will typically comprise about 1 to 5 weight percent. Any of various pigments standardly used in the powder coatings art can also be included. Pigment weight can be up to 80 percent of the weight of the entire coating and usually is around 35 weight percent of the coating. The compositions can further comprise a plurality of particles, such as organic or inorganic particles, or mixtures thereof, that contribute to the mar and/or scratch resistance of the coatings. Such particles are described in Ser. No. 10/007,149, filed on Dec. 5, 2001, which is hereby incorporated by reference. Pigments or solid additives in nanoparticulate form can also be included in the present compositions for the same purpose.

It is both a significant and surprising discovery that the present compositions will cure at low temperatures in the absence of any additional components, such as a crosslinking agent and/or accelerator typically used in conjunction with polyepoxide or siloxane resins, and thought to be required. In some cases, the use of a crosslinker and accelerator can actually raise the temperature required to cure the polyepoxide or siloxane, so their use may be undesirable for a low-cure product. With the epoxy/hydroxy-containing resins, a "dual cure" may occur; that is the epoxy may cure with itself and may also react with the OH functional groups to cure the resin. Although the inventors do not wish to be bound by any mechanism, it is believed that the reaction product or catalyst used in the present composition catalyzes the reaction of the polyepoxide molecules with themselves, or the siloxane molecules with themselves, depending on the type of resin used. This is in contrast to the standard mechanism of reaction, in which such a catalyst would be expected to facilitate the reaction between the resin and crosslinking agent. Thus, the present invention is further directed to a method for initiating self cure of an epoxy-containing resin or a siloxane-containing resin by adding any of the catalysts described herein to a composition comprising either an epoxy or siloxane.

The crosslink density of the cured coating compositions can be controlled to a large extent by controlling the amount of catalyst added to the composition. Higher amounts of catalyst usually gel the films faster and may crosslink the films more efficiently. In addition, there is a cost savings associated with those embodiments that eliminate crosslinkers and accelerators; the ability to cure at a lower temperature represents a further cost savings. Significantly, the present crosslinker-free and accelerator-free compositions result, upon curing, in coating compositions that have performance properties at least equal to that of conventional powder coatings in which the same resin and conventional crosslinker are used. This refers to the ability to maintain appearance as measured by a number of properties relevant to cured coatings, such as resistance to solvents, pencil hardness, and impact and corrosion resistance.

The present curable powder compositions can be prepared by standard methods known in the art. For example, the components are first thoroughly mixed to ensure spatial homogeneity of the ingredients. The composition is then intimately melt kneaded in an extruder. Typical zone temperatures during extrusion range from 40° C. to 125° C., such as 45° C. to 100° C. The exiting extrudate is rapidly cooled to terminate polymerization. The resulting chip is then micronized into powder with an average particle size of 0.1 to 200 microns, such as 1 to 100 microns. Comminution methods are well known, comminution can be accomplished, for example, by air-classifying mills, impact mills, ball mills, or other fracture-induced mechanisms. Post additives that improve fluidization of the powder mass and/or improve the resistance to impact fusion may be incorporated into the final product before or after micronization. As noted, the use of standard powder coating preparation methods is another advantage of the present invention.

Typically, the present powder compositions will have average particle sizes that range between 15 and 200 microns, such as between about 25 and 50 microns.

The powder coating compositions of the present invention can be applied to a substrate in any number of ways, most often by electrostatic spraying. The powder coating can be applied in a single sweep or in several passes to provide a film having a thickness after cure of from about 1 to 10 mils (25 to 250 microns), usually about 2 to 4 mils (50 to 100 microns). Other standard methods for coating application can also be employed.

After application, the present compositions may be cured by heating to a temperature of between about 80° C. and 190° C., preferably between about 80° C. and 125° C., for a period ranging from about 3 minutes to 30 minutes, such as 15 to 20 minutes. Heating can be effected by any means known in the art, typically by placing the coated substrate in an oven. IR radiation can also be used to heat cure the coated substrates.

Accordingly, the present invention is further directed to a method for coating a substrate comprising applying to the substrate one or more of the coating compositions described herein and curing the coating at a temperature of between about 80° C. and 190° C., such as between about 80° C. and 125° C. or between about 105° C. and 120° C. In such a method, the resin will self-cure, or react with itself by homopolymerization; this reaction is believed to be catalyzed by the present catalysts. Accordingly, the present invention is further directed to a cured coating layer comprising at least one resin selected from at least one epoxy-containing resin and/or at least one siloxane-containing resin, and one or more of the catalysts described herein, wherein the resin is self-cured.

A number of substrates are suitable for coating according to the methods of the present invention, including plastics such as thermosets or thermoplastics, cardboard, paper, wood, metal, particleboard and medium density fiberboard or mixtures thereof. Substrates coated according to the present methods are also within the scope of the present invention.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Plural encompasses singular and vice versa. As used herein, the term "polymer" refers to oligomers and both homopolymers and copolymers; the prefix "poly" refers to two or more.

EXAMPLES

The following examples are intended to illustrate the invention, and should not be construed as limiting the invention in any way.

Example A

This example demonstrates the preparation of a polymeric intermediate to be used in the preparation of a catalyst in accordance with the present invention.

Into a three-liter, four-necked reaction kettle equipped with a thermometer, a mechanical stirrer, and a nitrogen inlet were placed 300.0 parts by weight xylene under a constant nitrogen blanket. The content was then heated to 135° C. At that temperature, two separate charges were added to the reactor simultaneously over three hours. Charge I was a mixture of 364.0 parts by weight methyl methacrylate, 324.5 parts by weight styrene, 287.3 parts by weight 2-hydroxyethyl methacrylate, and 4.0 parts by weight methyl styrene dimer. Charge II was a mixture of 260.0 parts by weight xylene and 200.0 parts by weight t-amyl peroxyacetate. The mixture was held at 135° C. for one more hour after the additions were complete. Thereafter, a mixture of 16.0 parts by weight xylene and 20.0 parts by weight t-amyl peroxyacetate was added to the reactor over five minutes and the mixture further held for an additional hour at 135° C. Then, a mixture of 16.0 parts by weight xylene and 20.0 parts by weight t-amyl peroxyacetate was added to the reactor over five minutes and the mixture further held for an additional hour at 135° C. After the last hold, the reaction mixture was allowed to cool to room temperature and the reaction product was used as an intermediate to prepare a catalyst of the present invention.

Example B

This example demonstrates the preparation of a polymeric catalyst in accordance with the present invention.

Into a two-liter, four-necked reaction kettle equipped with a thermometer, a mechanical stirrer, and a nitrogen inlet were placed 99.9 parts by weight isophorone diisocyanate, 118.4 parts by weight toluene, and 0.2 parts by weight dibutyltin dilaurate under a constant nitrogen blanket. The mixture was heated to 38° C. At that point, 61.20 parts by weight 3-dimethylamino propylamine were added dropwise to the reactor while keeping the temperature thereof below 40° C. At the end of the addition, the mixture was held at 40° C. for two hours. Then, a mixture of 737.8 parts by weight of the intermediate of Example A and 0.2 parts by weight dibutyltin dilaurate was added to the reactor. Heat was applied as necessary to maintain the reaction temperature at 80° C., and held for two hours. A sample was pulled for infrared spectroscopy to confirm the disappearance of the isocyanate functionality. Toluene solvent was removed under vacuum and a slightly yellow reaction product was obtained with a Tg of 60° C. About 30 percent of the hydroxyl groups on the intermediate had reacted.

Example 1

Sample 1 was prepared using the components and amounts shown in TABLE 1, including the product prepared according to Example B. The coating was prepared by premixing the ingredients in a three-blade mixer rotating at 3500 rpm. The premix was then extruded in a 19 mm dual screw extruder operating at a temperature of 80° C. The extrudate was rapidly cooled and pressed into chip. The chip was micronized to an average particle size of 35 microns using a Hosokawa Air-Classifying Mill (ACM).

TABLE 1

|  | Sample 1 |
|---|---|
| EPON 1001[1] | 200 g |
| EPON 2002[2] | 200 g |
| PD 9060 (GMA Acrylic)[3] | 100 g |
| Product of Example B | 50 g |
| Resiflow PL-200[4] | 7 g |
| Emery 420 Stearic Acid[5] | 5 g |
| Thixcin R[6] | 15 g |
| $TiO_2$[7] | 290 g |

[1]EPON 1001 is a BPA epoxy, standard hybrid type, with an EW = 550 from Resolution Performance Products.
[2]EPON 2002 is a BPA epoxy, standard hybrid type, with an EW = 750 from Resolution Performance Products.
[3]PD 9060 is a glycidyl containing polymer having a Tg of 44° C., commercially available from Anderson Development, Inc. made in accordance with U.S. Pat. No. 4,042,645.
[4]Resiflow PL-200 is an acrylic copolymer flow additive mixed with silica available from Estron Chemical.
[5]Emery 420 Stearic Acid is hydrogenated stearic acid used as a flow additive available from Cognis Emery Group.
[6]Thixcin R is an organic derivative of castor oil used as a flow additive available from Elementis Specialty Chemicals.
[7]Titanium Dioxide R706 is available from E. I. DuPont de Nemours and Company.

The coating was sprayed onto Bonderite 1000 steel panels and cured at 121° C. for 25 minutes. Following cure, the panel was subjected to a number of tests standard in the industry for testing coatings. Tests and results are shown in TABLE 2.

TABLE 2

|  | Sample 1 |
|---|---|
| 100 MEK double rubs[8] | No scuff |
| Impact Reverse/Direct[9] | 100/160 |
| Appearance[10] | PCI = 7 |
| Gel time[11] | 2:10 |
| Powder stability (chemical)[12] | 2:10 |

[8]Powder Coatings Institute ("PCI") #8 Recommended Procedure. ("No scuff" means the coating is fully cured.)
[9]ASTM D2794 (Range <20 to 160 in*lbs.; 160 in*lbs = full flexibility.)
[10]PCI visual standards (Range 1 to 10 - 10 being the smoothest.)
[11]PCI #6 Recommended Procedure (gel time reported in minutes:seconds.)
[12]PCI #1 Recommended Procedure at 32° C. (stability reported in minutes:seconds.)

The results in TABLE 2 confirm that the polymeric catalyst can be used to cure epoxy powder coatings at low temperatures according to the present invention.

Whereas particular embodiments of this invention have been described above for purposes of illustration, it will be evident to those skilled in the art the numerous variations of the details of the present invention may be made without departing from the invention as defined in the appended claims.

What is claimed is:

1. A catalyst comprising a polymer of Formula I:

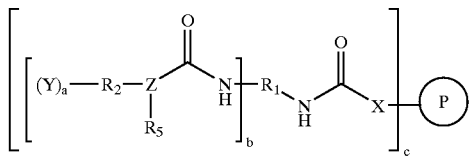 (I)

wherein $R_1$ is an organic radical having 6 to 25 carbon atoms; each $R_2$ is independently a multivalent hydrocarbon group having 1 to 20 carbon atoms; Y is

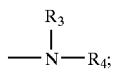

each $R_3$ and $R_4$ are independently alkyl or aryl groups having 1 to 12 carbon atoms; each Z is independently oxygen or nitrogen; $R_5$ is absent when Z is oxygen and $R_5$ is hydrogen, an alkyl or aryl group having 1 to 20 carbon atoms, or $(Y)_a$—$R_2$— when Z is nitrogen; a is at least 1; b is 1 or 2; c is at least 1; each X is independently S, O, or $N(R_6)$; each $R_6$ is independently hydrogen or an alkyl or aryl group having 1 to 12 carbon atoms; and P is a polymeric material.

2. The catalyst of claim 1, wherein Z is nitrogen, and $R_5$ is hydrogen.

3. The catalyst of claim 2, wherein $R_1$ is 1,3,3-trimethylcyclohexylmethylene and b=1.

4. The catalyst of claim 2, wherein $R_2$ is n-propylene.

5. The catalyst of claim 2, wherein $R_3$ and $R_4$ are methyl.

6. The catalyst of claim 1, wherein $R_2$ is alkylene.

7. The catalyst of claim 1, wherein $R_3$ and $R_4$ are alkyl.

8. The catalyst of claim 1, wherein X is O.

9. The catalyst of claim 1, wherein P is an acrylic polymer, a polyester polymer, or mixtures thereof.

10. A coating comprising:
 (a) the catalyst of claim 1; and
 (b) an epoxy-containing resin and/or a siloxane-containing resin.

11. The coating of claim 10, wherein the resin comprises a polyepoxide resin.

12. The coating of claim 10, wherein the resin comprises an epoxy/hydroxy-containing resin.

13. The coating of claim 10, wherein the resin comprises a siloxane-containing resin.

14. A method for coating a substrate comprising:
 (a) applying to said substrate the coating of claim 10; and
 (b) curing said coating.

15. The method of claim 14, wherein said coating is cured at a temperature of 80° C. to 125° C.

16. The method of claim 14, wherein said coating is cured at a temperature of greater than 125° C.

17. A substrate coated according to the method of claim 14.

18. The substrate of claim 17, wherein said substrate is comprised of a thermoplastic polymer, a thermoset polymer, cardboard, paper, wood, particleboard, medium density fiberboard and/or metal.

19. A cured coating layer comprising:
 (a) the catalyst of claim 1; and
 (b) an epoxy-containing resin and/or a siloxane-containing resin,
 wherein the epoxy and/or siloxane-containing resin has reacted with itself during cure.

20. A method for initiating self cure of an epoxy-containing resin and/or a siloxane-containing resin comprising adding the catalyst of claim 1 to a composition comprising said resin(s).

* * * * *